(12) United States Patent
Ikegami

(10) Patent No.: US 6,308,814 B1
(45) Date of Patent: Oct. 30, 2001

(54) PARKING LOCK MECHANISM FOR GATE TYPE AUTOMATIC TRANSMISSION SHIFT CONTROL DEVICE

(75) Inventor: Yasuyuki Ikegami, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/480,658

(22) Filed: Jan. 11, 2000

(30) Foreign Application Priority Data

Jan. 27, 1999 (JP) .................................................. 11-017793

(51) Int. Cl.⁷ .......................... B60K 41/26; F16H 61/22; F16H 59/02
(52) U.S. Cl. ...................................... 192/220.4; 192/220.7
(58) Field of Search .............................. 192/220.4, 220.5, 192/220.7

(56) References Cited

U.S. PATENT DOCUMENTS

| | | | |
|---|---|---|---|
| 5,695,029 | * 12/1997 | Yokoyama et al. | 192/219.6 |
| 5,980,423 | * 11/1999 | Suzuki et al. | 192/220.4 X |
| 6,009,769 | * 1/2000 | Ikegami | 192/220.4 |

FOREIGN PATENT DOCUMENTS 8-334167   12/1996   (JP).
8-338513   12/1996   (JP).

* cited by examiner

*Primary Examiner*—Allan D. Herrmann
(74) *Attorney, Agent, or Firm*—Foley & Lardner

(57) ABSTRACT

A parking lock mechanism for a gate type automatic transmission shift control device is provided. In the mechanism, a pair of upper and lower projections are formed the inner surface of a side wall of a housing at a location adjacent a portion of a gate opening corresponding to a parking position of a shift lever. A radial projection is formed on the shift lever in such a manner as to be capable of passing through an interval between the upper and lower projections on the side wall. A lock lever is swingably mounted on the inner surface of the side wall so as to be capable of abutting upon the projections on the side wall when the shift lever is in the parking position, for thereby preventing further movement of the shift lever. By an actuator which is energized in response to depression of a brake pedal, the lock lever is moved away from the projections on the side wall into a position for allowing the projection of the shift lever to pass through the projections on the side wall and thereby allowing the shift lever to be shifted from the parking position to a park lock released position.

6 Claims, 4 Drawing Sheets

PARKING LOCK MECHANISM FOR GATE TYPE AUTOMATIC TRANSMISSION SHIFT CONTROL DEVICE

BACKGROUND OF THE INVENTION

1. Field of the Invention

The present invention relates in general to shift control devices for automatic transmissions for automotive vehicles and more particularly to a parking lock mechanism for a gate type automatic transmission shift control device.

2. Description of the Related Art

A parking lock mechanism in an automatic transmission shift control device prevents a shift lever from being shifted from a parking position into any other gear positions unless a brake pedal is depressed after start of an engine in order to prevent sudden start of an automotive vehicle. More specifically, the parking lock mechanism includes a lock lever which is swingable when actuated by an actuator in responsive to depression of the brake pedal. When the shift lever is in the parking position, the lock lever prevents a position pin in contact with a detent cutout portion from being pushed down for thereby preventing the shift lever from being shifted from the parking position into any other gear positions. In such a shift control device, the shift lever moves along a linear shift groove so as to be shifted into one of gear positions of P (Parking), R (Reverse), N (Neutral), D (Drive) and L (Low).

A gate type automatic transmission shift control device in which a shift lever moves along a gate opening having a crank-like shape, is disclosed for example in Japanese Patent Provisional Publication No. 8-334167. In this shift control device, a lock lever is swingably supported on a housing which is formed with a gate opening. The shift lever has a radial projection which is capable of abutting upon the lock lever. When the shift lever is shifted into a parking (P) position, the projection is caused to abut upon the lock lever to disable shift of the shift lever from the parking position into a parking lock released position. In this instance, the lock lever in contact with the projection of the shift lever is urged against the side wall of the housing, so that the side wall serves as a bearing or support member.

SUMMARY OF THE INVENTION

However, in such a shift control device in which the projection of the shift lever urges the lock lever against the side wall of the housing so that the side wall serves as a bearing or support member, the side wall of the housing is necessarily required to have a large strength. The housing has been designed on the structure, material, etc. so as to meet the above requirement, resulting in that the housing is large-sized in the widthwise direction and complicated in shape. The prior art gate type automatic transmission shift control device thus encounters a problem that it is costly.

It is an object of the present invention to provide a parking lock mechanism for a gate type automatic transmission shift control device which is free from the above noted problem inherent in the prior art shift control device.

It is a further object of the present invention to provide a parking lock mechanism for a gate type automatic transmission shift control device of the foregoing character which does not require the side wall of the housing be strong enough as to serve as a bearing or support member but can eliminate the requirements otherwise necessitated in design of the housing with respect to the structure, material, etc. thereof.

It is a further object of the present invention to provide a gate type automatic transmission shift control device which is lower in cost as compared with a comparable prior art device.

To achieve the above objects, the present invention provides a parking lock mechanism for a gate type shift control device for an automotive automatic transmission. The shift control device includes a housing having a gate opening and a vertical side wall, and a shift lever shiftable along the gate opening into a plurality of gear positions including a parking position and a parking lock released position. The parking lock mechanism comprises a pair of first projections formed on an inner surface of a side wall of the housing, the first projections being vertically spaced from each other and located adjacent a portion of the gate opening corresponding to the parking lock released position of the shift lever, a second projection formed on the shift lever in a way as to protrude radially therefrom and capable of passing through an interval between the first projections when the shift lever is shifted from the parking position into any other gear positions, a lock lever mounted on the inner surface of the side wall in a way as to be swingable along the inner surface and between a first position where it abuts upon the first projections to prevent shift of the shift lever from the parking position to a parking lock released position and a second position where it is spaced away from the first projections to allow the second projection to pass through the interval between the first projections and thereby allow shift of the shift lever from the parking position to the parking lock released position, and an actuator for actuating the lock lever to move into the second position when energized in response to depression of a brake pedal and allowing the lock lever to move into the first position when deenergized.

Accordingly, when the shift lever is in a parking position, a gearshift operation for shifting the shift lever from a parking position to any other gear position without depressing the brake pedal is obstructed since the lock lever is abutted upon or in contact with the pair of upper and lower projections on the side surface of the housing. In this instance, the lock lever is supported by both of the upper and lower projections, thus not causing any large load to be applied to the support portion of the lock lever whilst not subjecting the side wall to any large load in the thickness direction thereof.

DETAILED DESCRIPTION OF THE PREFERRED EMBODIMENT

Figure 3:
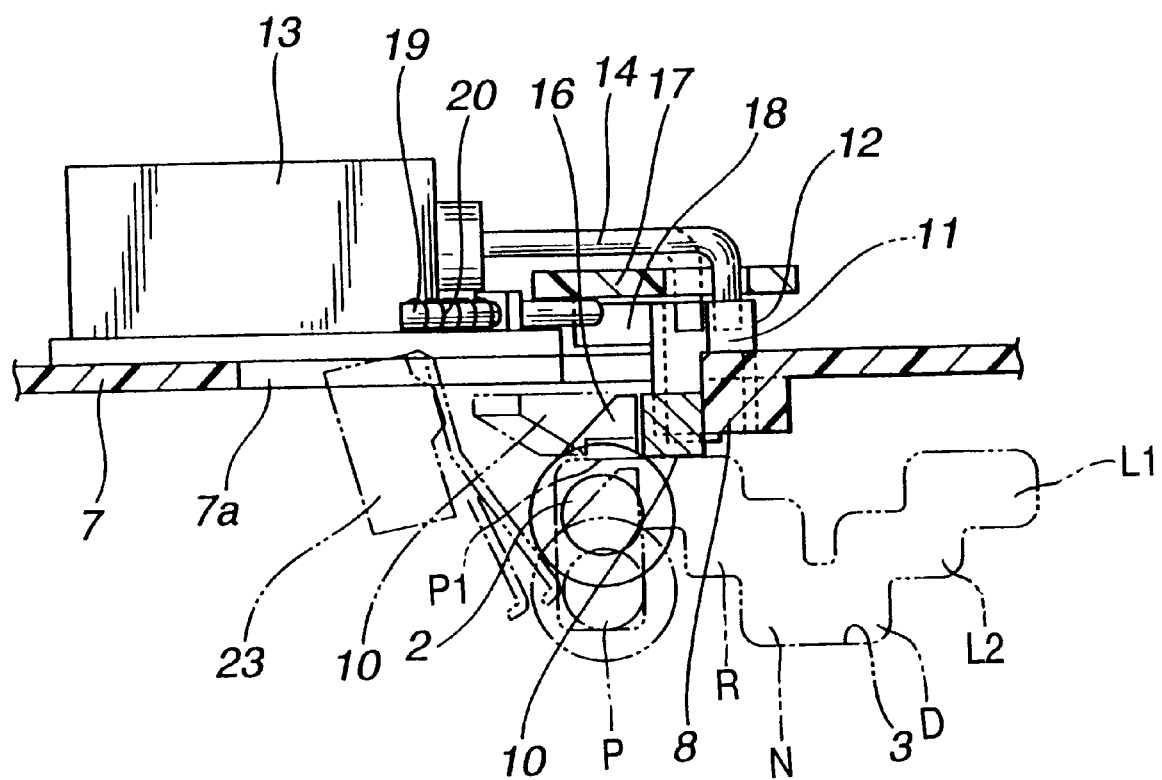
FIG. 3 is a sectional view taken along the line III—III in FIG. 2.
Figure 4:
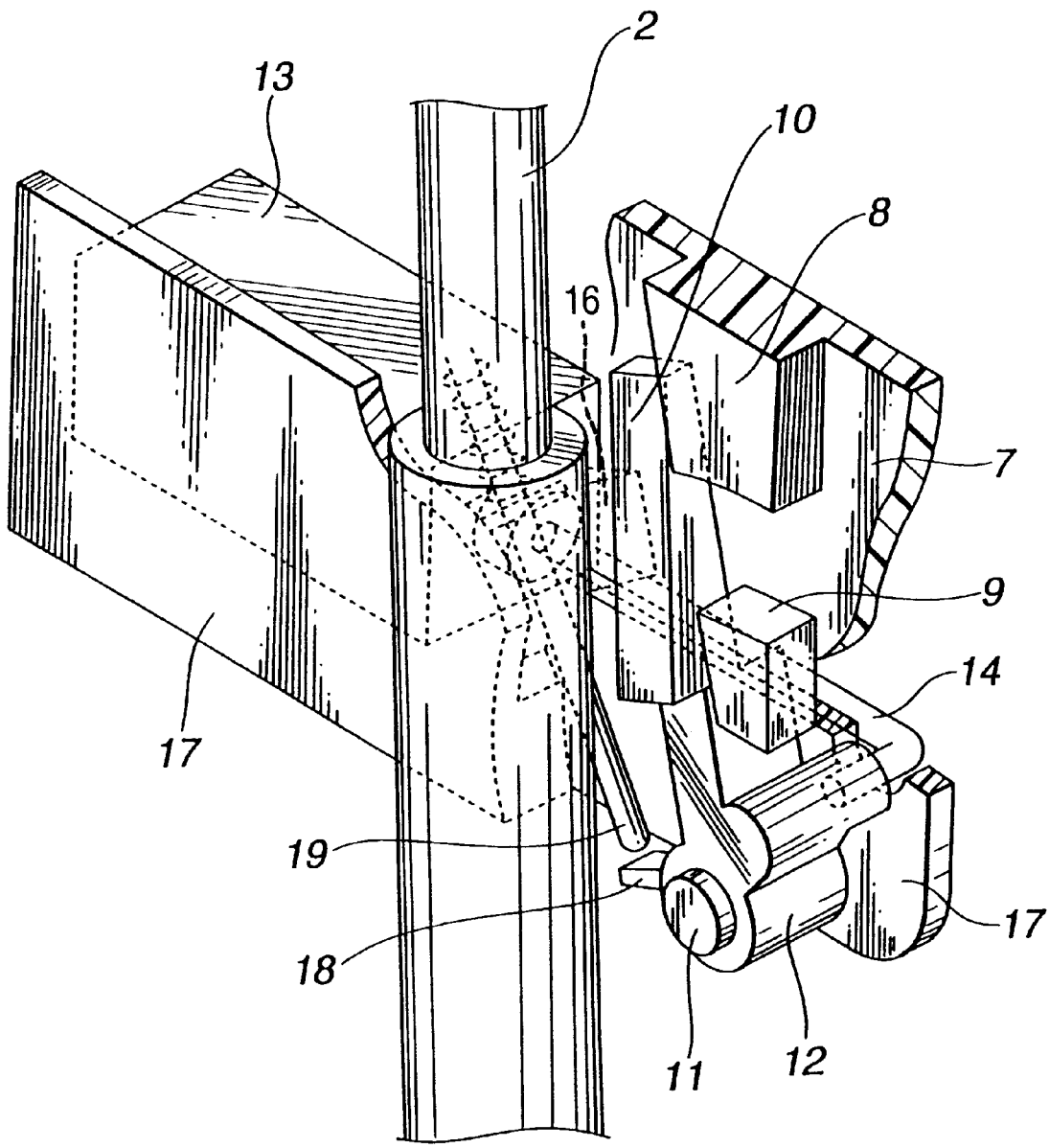
FIG. 4 is a perspective view of the principal portion of the automatic transmission shift control device of FIG. 1.

Referring to FIGS. 1 to 4 inclusive, a gate type automatic transmission shift control device for an automotive vehicle is generally indicated by 1 and includes a shift lever 2 which is movable in a gate opening 3 having a crank like shape (refer to FIG. 3). The gate like opening 3 is formed in a top wall of a housing 4. The shift lever 2 is supported on the housing 4 by way of a lateral pivot 5 so as to be swingable in the front-to-rear directions and by way of a longitudinal pivot 6 so as to be swingable in the lateral directions. The gate opening 3 has portions corresponding to, other than a parking position P and a parking lock released position P1, a reverse position R, neutral position N, drive position D, second gear position L2 and low gear position L1 of the shift lever 1, in sequence.

Figure 1:
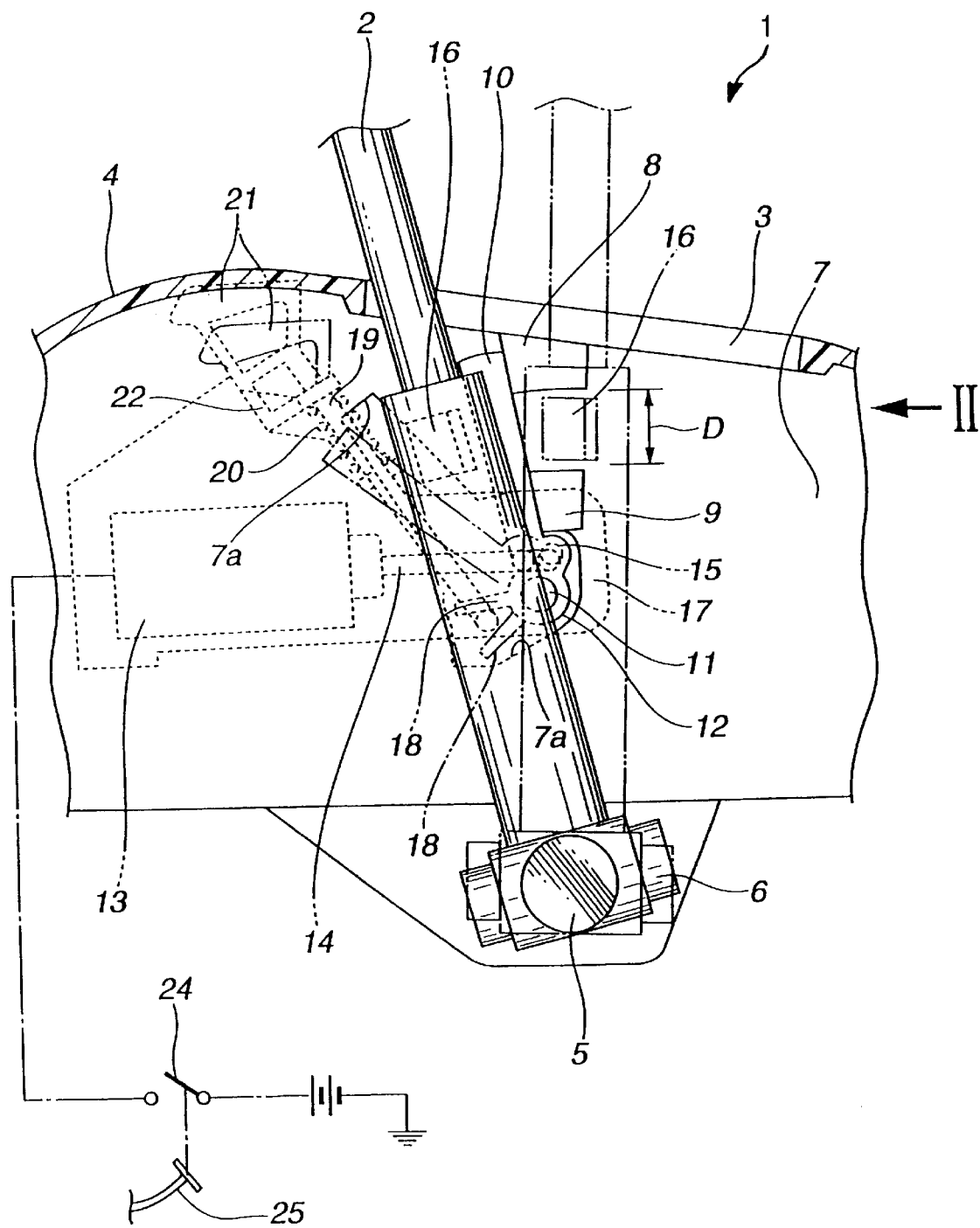
FIG. 1 is a sectional view of a principal portion of an automotive automatic transmission shift control device according to an embodiment of the present invention.
Figure 2:
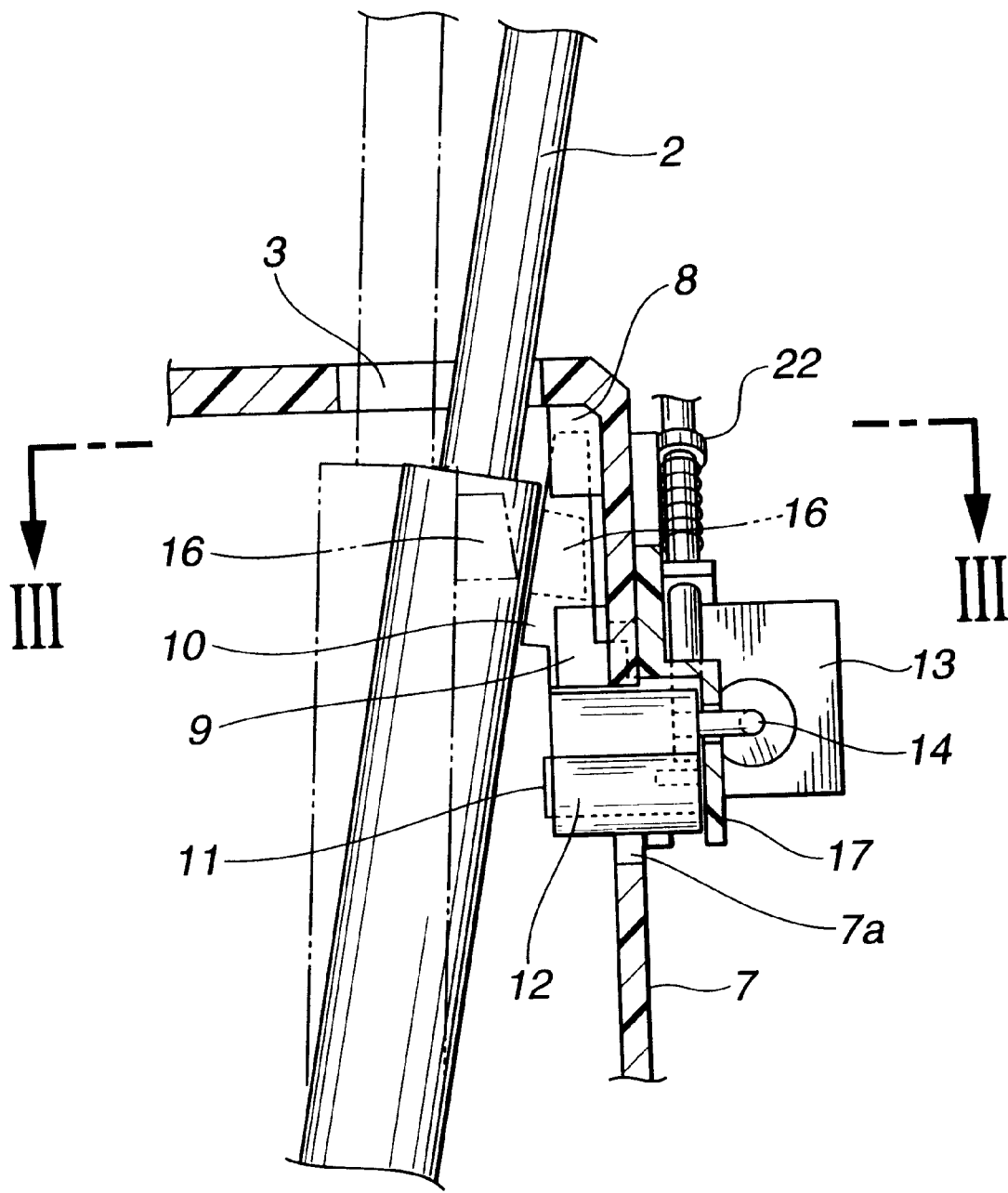
FIG. 2 is a view taken along the arrow 11 in FIG. 1.

The housing 4 has a vertical side wall 7 which is formed with a pair of upper and lower projections 8 and 9 at a location adjacent a portion of the gate opening 3 corresponding to the parking lock released position of the shift lever 1. The projections 8 and 9 are preferably formed integral with the side wall 7 but may be comprised of independent members attached to the side wall 7 by a suitable fixing means. The projections 8 and 9 are vertically spaced a distance D (FIG. 1). At a place ahead of the projections 8 and 9, the side wall 7 is formed with an opening 7*a*. A unit base 17 is disposed outside of the housing 4 at a location corresponding to the opening 7*a* and fixed to the housing 4. A lock lever 10 swingably supported by way of a shaft 11 on the unit base 17 is disposed inside the housing through the opening 7*a* so as to be able to abut upon the projections 8 and 9. Accordingly, the opening 7*a* has a particular shape similar to and a little larger than the plane figure of the lock lever 10 so that the lock lever 1 0 can be inserted into the housing 4 through the opening 7*a*. A support portion 12 of the lock lever 10 is formed with a hole 15 having an oval-like cross section in which an end portion of a plunger 14 of an actuator 13 is pivotally engaged. The actuator 13 is fixed to the unit base 17 and causes the plunger 14 to retract when a brake pedal switch 24 is operated in response to depression of a brake pedal 25 of the automotive vehicle and causes the lock lever 10 to turn or swing forward of a vehicle body.

The support portion 12 of the lock lever 10 has an integral arm 18. A rod 19 is mounted on the unit base 17 in a way as to be able to abut upon the arm 18 and is urged against the arm 18 under the bias of a return spring 20. A knob 21 integral with the rod 19 is disposed outside of and above the housing 4. The unit base 17 has a support 22 for supporting the rod 19. A limit switch 23 is provided to detect whether the shift lever 2 is shifted into the parking position.

The shift lever 2 has a projection 16 protruding radially therefrom. The projection 16 is so sized and positioned vertically as to be able to pass through the interval D (FIG. 1) whilst being about to abut upon the lock lever 10. Accordingly, when the shift lever 2 is shifted into the parking position and the key switch is OFF to park the car, the actuator 13 is deenergized to allow the plunger 14 to protrude under the bias of a built-in spring (not shown), thus causing the lock lever 10 to turn clockwise about the shaft 11 and abut upon the projections 8 and 9.

Under this condition, if it is tried to shift the shift lever 2 from the parking position to the parking lock released position without depressing the brake pedal 25 after start of an engine (not shown), the projection 16 of the shift lever 2 is caused to abut upon the lock lever 10 to prevent further movement of the shift lever 2 so that a parking lock is maintained. If it is tried to shift the shift lever 2 by force, the load applied from the projection 16 to the lock lever 1 0 is transmitted to the projections 8 and 9 and then to the side wall 7. In this instance, the load is applied to the side wall 7 in the direction of elongation or extension thereof, i.e., in the direction normal to the thickness direction thereof. Accordingly, even if the thickness of the side wall 7 is small, reinforcement of the side wall 7 is not necessitated because the load is applied to the side wall 7 in the direction of extension thereof.

Then, when the brake pedal 25 is depressed to turn on the brake pedal switch 24, the actuator 13 is operated to allow the plunger 14 to retract, thus causing the lock lever 10 to turn about the shaft 11 anticlockwise and forwardly of the car. This allows the projection 16 of the shift lever 2 to be able to shift into the parking lock released position without abutting upon the lock lever 10, so that the shift lever 2 is able to shift rearward of the vehicle into the reverse position. In this instance, since the projection 16 of the shift lever 2 passes through the interval D between the projections 8 and 9, there is not caused any obstruction to shift of the shift lever 2.

Thus, in a parking lock mechanism in which the shift lever 2 cannot be moved unless the brake pedal 25 is depressed when the shift lever 2 is locked in the parking lock position, the lock lever 10, when preventing shift of the shift lever 2, is caused to bear against both of the projections 8 and 9 which are fixed to the side wall 7 of the housing 4 so that the load on the shift lever 2 is supplied or inputted to the side wall 7 in the direction of extension thereof. By this, it is not necessary to provide the side wall 7 which serves as a bearing or support member, with a particular reinforcement, thus not requiring an increased size and a particular material of the housing 4. Thus, it becomes possible to make lower the cost of the parking lock mechanism and therefore of the automatic transmission shift control device. Further, it becomes possible to improve the durability of the lock lever 10 since a large load is not applied to the support portion 1 2 of the lock lever 10.

From the foregoing, it will be understood that according to the present invention, in case the brake pedal 25 is not depressed to operate the actuator 13, the projection 16 on the shift lever 2 is caused to abut upon the lock lever 10 which is held in contact with the pair of upper and lower projections 8 and 9 on the side wall 7 of the housing 4 so as to be supported thereby, so a parking lock is maintained. The bearing or support member is thus provided by the pair of projections 8 and 9 which constitute part of the side wall 7 of the housing 4. However, the load is applied to the side wall 7 of the housing in the direction of extension of the side wall 7 so the strength of the side wall is not required to be so large. Accordingly, it is not necessary to make the housing 4 large-sized and use a particular material for increase of the strength thereof, thus making it possible to lower the cost. Further, the side wall 7 serves as a support member for supporting the load applied thereto from the lock lever 10, so it becomes possible to prevent application of a large load to the support portion of the lock lever 10, thus making it possible to prevent damage or the like of the lock lever 10 and therefore making it possible to improve the durability of the lock lever. Further, the unit base 17 is provided for mounting thereon the lock lever 10 and the actuator 13, so the automatic transmission shift control device 1 can be assembled with an improved efficiency.

While the invention has been described by reference to a single embodiment, the invention is not limited to the precise construction shown but various modifications and variations could be made thereto by those skilled in the art without departing from the scope of the appended claims.

What is claimed is:

1. A parking lock mechanism for a gate type shift control device for an automotive automatic transmission, the shift control device including a housing having a gate opening and a vertical side wall, and a shift lever shiftable along the gate opening into a plurality of positions including a parking position and a parking lock released position, the parking lock mechanism comprising:

a pair of first projections formed on an inner surface of said side wall of said housing;

said first projections being vertically spaced from each other and located adjacent a portion of said gate opening corresponding to the parking lock released position of said shift lever;

a second projection formed on said shift lever in a way as to protrude radially therefrom and capable of passing through an interval between said first projections when said shift lever is shifted from the parking position into the parking lock released position;

a lock lever mounted on said inner surface of said side wall in a way as to be swingable along said inner surface and between a first position where it abuts upon said first projections to prevent shift of said shift lever from the parking position to the parking lock released position and a second position where it is spaced away from said first projections to allow said second projection to pass through the interval between said first projections and thereby allow shift of said shift lever from the parking position to the parking lock released position; and an actuator for actuating said lock lever to move into said second position when energized in response to depression of a brake pedal and allowing said lock lever to move into said first position when deenergized.

2. The parking lock mechanism according to claim 1, further comprising a unit base on which said lock lever and said actuator are mounted, said unit base being disposed outside of and fixedly attached to said side wall of said housing, said side wall being formed with an opening for allowing said lock lever to pass therethrough and be disposed inside of said housing.

3. The parking lock mechanism according to claim 2, further comprising a manual release rod slidably mounted on said unit base and a spring urging said release rod in a predetermined direction, said lock lever having a support portion at which it is swingably mounted on said unit base and an arm projecting radially from said support portion, said release rod being capable of contacting at an end with said arm and operable to cause said lock lever to move into said second position when manually pushed against the bias of said spring.

4. A gate type shift control device for an automatic transmission for an automotive vehicle comprising:

a housing having a gate opening and a vertical side wall;

a shift lever swingable, along said gate opening, in a longitudinal direction and a lateral direction of a vehicle body and shiftable into a plurality of positions including a parking position and a parking lock released position;

a pair of first projections formed on an inner surface of a side wall of said housing;

said first projections being vertically spaced from each other and located adjacent a portion of said gate opening corresponding to the parking lock released position of said shift lever;

a second projection formed on said shift lever in a way as to protrude radially therefrom and capable of passing through an interval between said first projections when said shift lever is shifted from the parking position into the parking lock released position;

a lock lever mounted on said inner surface of said side wall in a way as to be swingable along said inner surface and between a first position where it abuts upon said first projections to prevent shift of said shift lever from the parking position to the parking lock released position and a second position where it is spaced away from said first projections to allow said second projection to pass through the interval between said first projections and thereby allow shift of said shift lever from the parking position to the parking lock released position; and an actuator for actuating said lock lever to move into said second position when energized in response to depression of a brake pedal and allowing said lock lever to move into said first position when deenergized.

5. The shift control device according to claim 4, further comprising a unit base on which said lock lever and said actuator are mounted, said unit base being disposed outside of and fixedly attached to said side wall of said housing, said side wall being formed with an opening for allowing said lock lever to pass therethrough and be disposed inside of said housing.

6. The shift control device according to claim 5, further comprising a manual release rod slidably mounted on said unit base and a spring urging said release rod in a predetermined direction, said lock lever having a support portion at which it is swingably mounted on said unit base and an arm projecting radially from said support portion, said manual release rod being capable of contacting at an end with said arm and operable to cause said lock lever to move into said second position when manually pushed against the bias of said spring.

* * * * *